United States Patent Office 3,373,153
Patented Mar. 12, 1968

3,373,153
N-LOWER ALKYLIDENE AMINO-IMINODIBENZYL
Aaron Cohen, Basil Heath-Brown, and Christopher John Cattanach, Welwyn Garden City, England, assignors to Hoffmann-La Roche Inc., Nutley, N.J., a corporation of New Jersey
No Drawing. Filed May 25, 1965, Ser. No. 458,765
Claims priority, application Great Britain, Apr. 14, 1965, 22,738/64
1 Claim. (Cl. 260—239)

The present invention relates to a process for the preparation of compounds of the formula

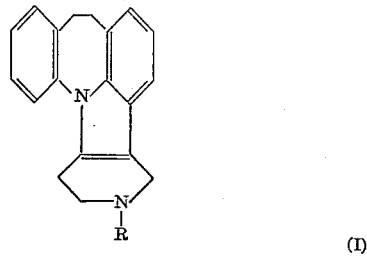

wherein R is lower alkyl (i.e., a straight or branched chain alkyl group having from 1 to 7 carbon atoms).

The above compounds are useful as intermediates in the preparation of compounds of the formula

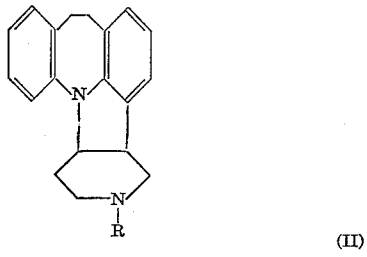

wherein R is lower alkyl, which are useful as antidepressants.

In addition, the compound of Formula I wherein R is methyl is useful as an antiserotonin and antihistaminic agent.

The compounds of Formulae I and II and processes relating thereto are disclosed and claimed in copending application Ser. No. 458,766 entitled "Compounds, Processes, and Intermediates," in favor of Aaron Cohen and Basil Heath-Brown, filed of even date herewith.

The process of the invention is carried out according to the following reaction scheme:

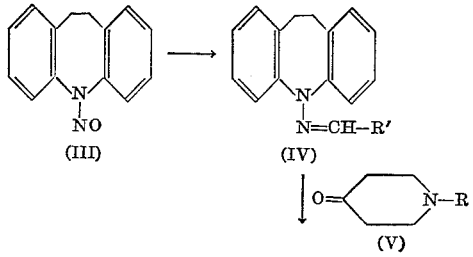

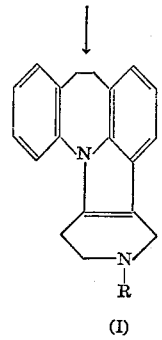

In the above reaction scheme R is lower alkyl, i.e., a $C_1$–$C_7$ straight or branched chain alkyl group, and R' is hydrogen or a $C_1$–$C_6$ straight or branched chain alkyl group.

The reaction is carried out by reacting N-nitroso-imino dibenzyl (III) with a lower alkyl magnesium halide, e.g., chloride, bromide, or iodide, by means of a Grignard reaction, e.g., in diethyl ether, and hydrolyzing the Grignard complex formed to form a compound of Formula IV. Standard techniques are employed to hydrolyze the Grignard complex, such as the use of ice or water and dilute acetic or mineral acid. The compound of Formula IV is then condensed with a 1-lower alkyl-4-oxopiperidine of Formula V in the presence of at least one mole of an acid to form the compound of Formula I.

Suitable acids for use in the above condensation are the lower alkanoic acids (e.g., glacial acetic acid, propionic acid, etc.) and lower alkanolic hydrohalic acids (e.g., ethanolic hydrochloric acid, methanolic hydrobromic acid, propanolic hydriodic acid, etc.)

N-nitroso-iminodibenzyl (III) is prepared according to the process of the above-identified copending application by reacting iminodibenzyl with nitrous acid.

The invention will be better appreciated by reference to the following example which is given for illustration purposes only and is not meant to be limitative thereof.

EXAMPLE 5 g. (0.0223 mole) of N-nitroso-iminodibenzyl, prepared as described in the above-identified copending application, in 40 ml. of tetrahydrofuran were added with stirring during 0.75 hour to a solution of ethyl magnesium iodide [made from 13.9 g. (0.0892 mole) of ethyl iodide and 2.15 g. (0.0892 mole) of magnesium in 120 ml. of dry ether]. The temperature was maintained at 25° C. After a further hour the mixture was decomposed with ice and dilute acetic acid, and the crude product was extracted with ether. After evaporation and column chromatography on alumina in benzene solution, N-ethylideneamino-iminodibenzyl was isolated as crystals which melted at 65° C. after crystallization from methanol.

(a) 2.5 g. (0.0106 mole) of N-ethylideneamino-iminodibenzyl and 1.31 g. (1.1×0.0106 mole) of 1-methyl-4-piperidone were dissolved in 25 ml. of glacial acetic acid and the solution was heated at 100° C. for 0.5 hour. After evaporation under reduced pressure, the residue was dissolved in water, extracted with ether and the aqueous solution made alkaline and extracted with benzene. The benzene solution was dried and purified by chromatography on alumina. Evaporation of the eluate yielded a gum which was crystallized from acetone to give 11-methyl-5,6,10,11,12,13 - hexahydro - 1 - benzazepino[3,2,1-h,i]pyrido[4,3-b]indole of melting point 148°–150° C.

(b) A mixture of 1 g. (0.0042 mole) of N-ethylidene-aminoiminodibenzyl, 0.48 g. (0.0042 mole) of 1-methyl-4-piperidone, 15 ml. of ethanol and 2.8 ml. (0.0084 mole) of 3 N ethanol hydrochloric acid was heated at reflux for 4 hours. The solvent was evaporated off under reduced pressure, water was added, and the mixture was extracted with ether. The aqueous layer was made alkaline with dilute ammonium hydroxide solution and extracted with chloroform. The dried extract was evaporated to yield 0.4 g. of crude 11-methyl-5,6,10,11,12,13-hexahydro-1-benzazepino[3,2,1-h,i]pyridol[4,3-b]indole. The crude product was crystallized from acetone to give a white solid of melting point 148°–150° C.

We claim:
1. A compound of the formula

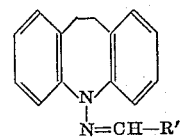

$$N=CH-R' \quad (IV)$$

wherein R' is selected from the group consisting of hydrogen and a $C_1$–$C_6$ alkyl group.

References Cited

Porai-Koshits et al., Zhurnal Obshchei Khimii, vol. 34, No. 6, pp. 2094–2095 (1964) QD1Z6.

ALTON D. ROLLINS, *Primary Examiner.*